US012686569B2

(12) United States Patent
　Lema

(10) Patent No.:　US 12,686,569 B2
(45) Date of Patent:　Jul. 21, 2026

(54) METHOD AND APPARATUS FOR SINGULATING AND DISPENSING BEADS

(71) Applicant: Air Industrial Robotics, Inc., Fremont, CA (US)

(72) Inventor: Frank Lema, Fremont, CA (US)

(73) Assignee: Air Industrial Robotics, Inc., Fremont, CA (US)

( * ) Notice: Subject to any disclaimer, the term of this patent is extended or adjusted under 35 U.S.C. 154(b) by 70 days.

(21) Appl. No.: 18/798,460

(22) Filed: Aug. 8, 2024

(65) Prior Publication Data

US 2025/0051102 A1　Feb. 13, 2025

Related U.S. Application Data

(60) Provisional application No. 63/531,869, filed on Aug. 10, 2023.

(51) Int. Cl.
　*B65G 47/14*　(2006.01)
　*B65G 51/04*　(2006.01)

(52) U.S. Cl.
　CPC ......... *B65G 47/1485* (2013.01); *B65G 51/04* (2013.01)

(58) Field of Classification Search
　USPC ............. 198/397.01, 397.03, 397.04, 397.05
　See application file for complete search history.

(56) References Cited

U.S. PATENT DOCUMENTS

| | | |
|---|---|---|
| 4,091,660 A | 5/1978 | Itoh |
| 4,266,477 A | 5/1981 | Ackley |
| 4,308,942 A | 1/1982 | Ackley |
| 4,353,456 A * | 10/1982 | Yamamoto .............. A61J 3/074 |
| | | 198/384 |
| 4,369,702 A | 1/1983 | Ackley |
| 4,377,971 A | 3/1983 | Ackley |
| 9,999,949 B2 | 6/2018 | Hester et al. |

(Continued)

FOREIGN PATENT DOCUMENTS

| | | |
|---|---|---|
| EP | 0183611 B1 | 2/1990 |
| JP | H06-135542 A | 5/1994 |

(Continued)

OTHER PUBLICATIONS

Search Report from corresponding European Patent Application No. 23179543.6, dated Nov. 8, 2023.

*Primary Examiner* — Gene O Crawford
*Assistant Examiner* — Amari J Meddling
(74) *Attorney, Agent, or Firm* — Dergosits & Noah LLP; Todd A. Noah

(57)　ABSTRACT

Devices and methods are disclosed for singulating and dispensing a bead. A bulk hopper holds and presents a plurality of beads to a singulation tube that defines a pathway from the bulk hopper to a rotating protection nest. The rotating protection nest has a pocket configured to retain a single bead. A vacuum source is configured to draw beads from the bulk hopper into the singulation tube when the pocket of the rotating protection nest is in a pickup position and aligned with the singulation tube until a single bead is seated within the pocket. The singulation tube may define one or more buffer zones and/or a separation threshold to control delivery of beads from the bulk hopper to the protection nest. The bulk hopper may have a tapered rotating disk to deliver beads to the singulation tube.

16 Claims, 3 Drawing Sheets

(56)                    References Cited

U.S. PATENT DOCUMENTS

| 10,556,712 | B2 | 2/2020 | Wolf et al. |
| 10,926,907 | B2 * | 2/2021 | Maruyama ............... A61J 1/035 |
| 2023/0410589 | A1 | 12/2023 | Lema |

FOREIGN PATENT DOCUMENTS

| WO | 198203843 | A1 | 11/1982 |
| WO | 199824549 | A1 | 6/1998 |

* cited by examiner

METHOD AND APPARATUS FOR SINGULATING AND DISPENSING BEADS

RELATED APPLICATIONS

This application claims priority to U.S. Provisional Application No. 63/531,869, filed Aug. 10, 2023. The priority of this application is expressly claimed, and its disclosure is hereby incorporated by reference in their entirety.

FIELD OF THE PRESENT DISCLOSURE

This disclosure relates to devices and techniques for separating and delivering fragile objects such as lyophilized beads to a desired location.

BACKGROUND

Lyophilization is a process for sublimating water from a frozen product under a vacuum colloquially known as "freeze-drying" and has been widely adopted in the pharmaceutical industry. Benefits associated with this process include enhanced stability of the product and ready reconstitution while minimizing risk of heat degradation. One example of lyophilization applies the process to a liquid droplet to form a lyophilized bead, also termed a lyobead. Despite the advantages noted above, lyobeads can be very difficult to reliably separate, control and transfer without high risk of damage due to their static properties, low mass and delicate nature. Consequently, current methods of bead delivery create high levels of bead damage, are unreliable and/or require multiple steps to separate beads.

For context, one conventional method for separating and dispensing lyobeads relies on a vacuum source to pick and place individual beads. A vacuum end effector is used to pick up and transfer pre-separated beads. Such techniques require a relatively high vacuum and minimal leakage to securely hold the beads, which increases the potential of bead damage either because of vacuum cup force when picking or indentations created by the vacuum cup. Moreover, due to the low mass and high static properties of the beads, this method requires an additional step to separate single beads prior to the vacuum pickup. Another conventional technique involves a shearing technique employing pressurized air or another mechanical mechanism, as depicted in FIG. 1. In this method, a vertical tube 10 allows beads to be stacked and air pressure is used to separate singular beads 12 through a perpendicular horizontal tube 14 as schematically indicated. The method requires a precise fit between the feed tube and beads and tends to be unreliable due to the low mass and static properties of beads. For example, beads slide against each other during the shearing process causing damage and fragmentation. Beads can also stack off center, requiring higher force to shear which increases the chance of damage. Further, debris from damaged beads can jam the feeder or contaminate the separated bead output feed which undermines accuracy of the bead dosage.

Accordingly, it would be desirable to provide a method and apparatus for reliably separating individual highly fragile objects such as lyobeads from bulk and delivering them to a precise location undamaged. It would also be desirable to singulate and dispense lyobeads from high-capacity hoppers to reduce the frequency of refilling and the consequent downtime. As will be detailed in the following materials, the bead singulator and dispensers of this disclosure satisfy these and other needs.

SUMMARY

This disclosure is directed to a bead singulator and dispenser featuring a bulk hopper configured to hold and present a plurality of beads, a rotating protection nest having a pocket configured to retain a single bead, a singulation tube defining a pathway from the bulk hopper to the protection nest and a vacuum source configured to draw beads from the bulk hopper into the singulation tube when the pocket of the protection nest is in a pickup position and aligned with the singulation tube.

In one aspect, the singulation tube may have a buffer zone with an elevation relatively below the pocket of the protection nest when the pocket is in the pickup position. Further, the singulation tube may be coupled to an aperture in the bulk hopper and may also have a separation threshold with an elevation relatively above the aperture and the buffer zone.

In one aspect, the singulation tube may also have a loop that defines a supplemental buffer zone.

In one aspect, the vacuum source may be configured to be at least partially blocked when a single bead is seated in the pocket of the protection nest.

In one aspect, the protection nest may be configured to rotate to a position that aligns a bead seated within the pocket with a transfer tube.

In one aspect, the bulk hopper may have a rotating disk with a circumference and an axis of rotation, such that the bulk hopper tapers from a relatively greater elevation at the axis of rotation to a relatively lesser elevation at the circumference. The rotating disk may be controllable to achieve a desired rate of delivery of the plurality of beads in the bulk hopper to the singulation tube. Controlling the rotating disk may include adjusting at least one of an angle of the taper of the disk, a speed of rotation of the disk and a direction of rotation of the disk.

This disclosure is also directed to a method for singulating and dispensing one bead from a plurality of beads. The method may involve providing a bulk hopper configured to hold and present a plurality of beads, coupling the bulk hopper to a singulation tube that defines a pathway from the bulk hopper to a rotating protection nest, wherein the protection nest has a pocket configured to retain a single bead and employing a vacuum source to draw beads from the bulk hopper into the singulation tube when the pocket of the protection nest is in a pickup position and aligned with the singulation tube until a single bead is seated within the pocket.

In one aspect, the method may also include providing a buffer zone in the singulation tube that has an elevation relatively below the pocket of the protection nest when the pocket is in the pickup position such that a portion of beads remaining in the singulation tube after the single bead is seated within the pocket migrate to the buffer zone. The singulation tube may be coupled to an aperture in the bulk hopper such that the method also involves providing a separation threshold in the singulation tube that has an elevation relatively above the aperture and the buffer zone.

In one aspect, the method may also include providing a loop in the singulation tube that defines a supplemental buffer zone, such that another portion of beads remaining in the singulation tube after the single bead is seated within the pocket migrate to the supplemental buffer zone.

In one aspect, the method may also include configuring the vacuum source so that the vacuum source is at least partially blocked when the single bead is seated in the pocket of the protection nest.

In one aspect, the method may also include rotating the protection nest to a position that aligns the single bead seated within the pocket with a transfer tube.

In one aspect, the method may also include providing the bulk hopper with a rotating disk having a circumference and an axis of rotation, wherein the bulk hopper tapers from a relatively greater elevation at the axis of rotation to a relatively lesser elevation at the circumference. The rotating disk may be controlled to achieve a desired rate of delivery of the plurality of beads in the bulk hopper to the singulation tube. Controlling the rotating disk may include adjusting at least one of an angle of the taper of the disk, a speed of rotation of the disk and a direction of rotation of the disk.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

Figures 1, 2:
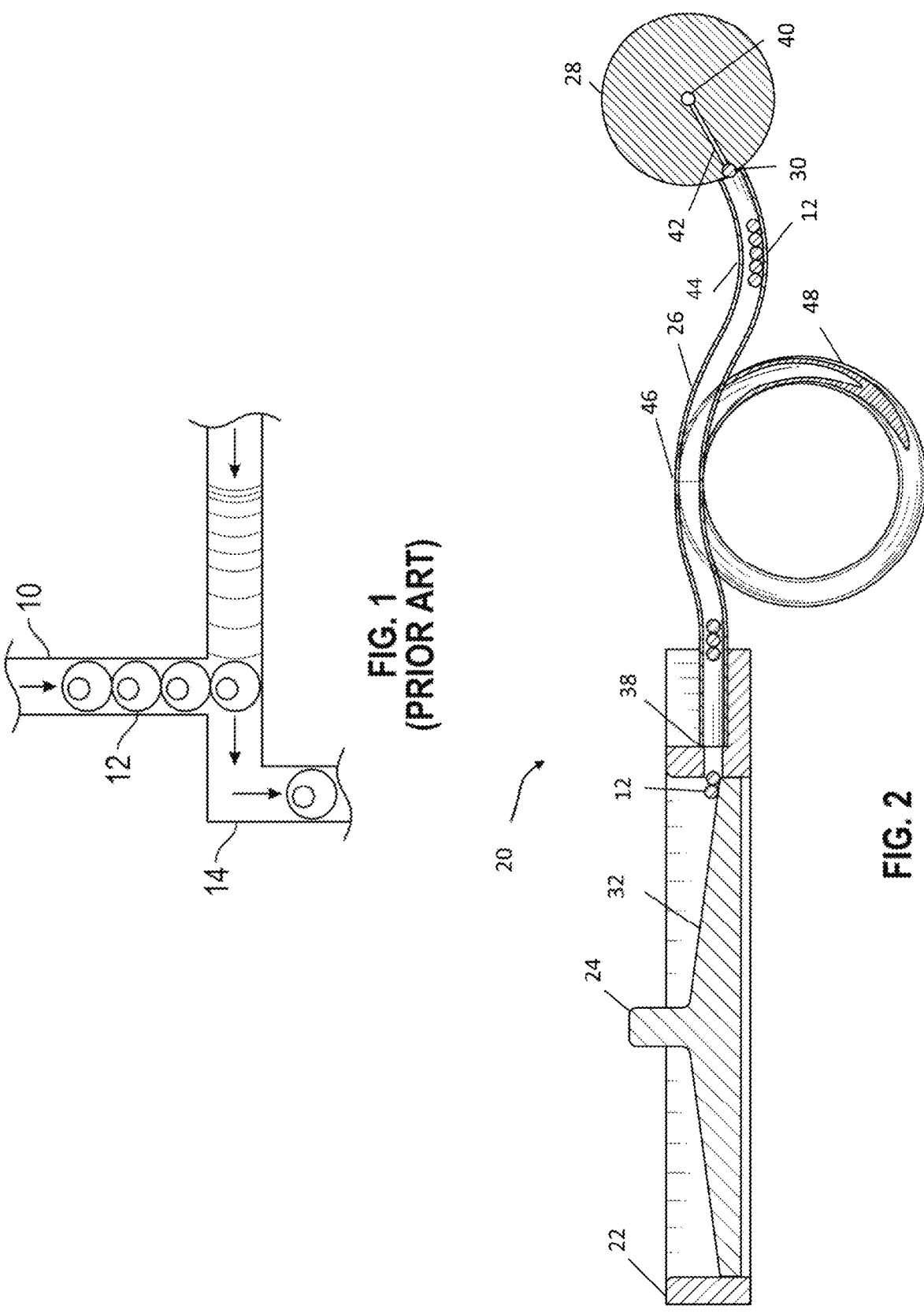
FIG. 1 is a schematic depiction of a prior art shearing technique for separating and dispensing beads.
FIG. 2 is a schematic view, partially in section, of a bead singulator and dispenser according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner.

Unless defined otherwise, all technical and scientific terms used herein have the same meaning as commonly understood by one having ordinary skill in the art to which the disclosure pertains. Moreover, as used in this specification and the appended claims, the singular forms "a," "an" and "the" include plural referents unless the content clearly dictates otherwise.

As will be discussed in further detail below, embodiments of this disclosure combine usage of a rotating disk, vacuum, air and a protection nest to gently separate and transfer the beads. A bulk hopper that receives a quantity of beads has a rotating disk that tapers from its center to its circumference. The taper causes gravity to migrate beads towards the circumference of the disk, while rotation brings individual beads adjacent a singulation tube having an uptake positioned at the circumference of the disk. The protection nest may be configured as a wheel having a pocket configured to retain and shield an individual bead. A vacuum source coupled to the protection nest communicates with the singulation tube through the pocket when the pocket is aligned in a pick-up position. Correspondingly, as the beads on the disk are passing by the singulation tube uptake, the vacuum pulls beads into the singulation tube to a buffer zone, located at an elevation below the pocket. The vacuum also pulls a bead from the buffer zone into the pocket of the protection wheel. Once a bead is seated in the pocket, the vacuum source is at least partially blocked which reduces the pulling force on any remaining beads queued in the singulation tube and allows them to return to the buffer zone due to gravity. Rotating the protection nest then delivers the bead singulated in the pocket to a delivery location for further processing. Continued rotation of the protection nest brings the pocket back into alignment with the pick-up position and reestablishes communication with the vacuum source so that the singulation and delivery process can iterate.

Referring first to FIG. 2, an overall schematic view of the bead singulator and dispenser 20 is shown to include bulk hopper 22, rotating disk 24, singulation tube 26 and protection nest 28. Items not shown for the sake of clarity include a drive mechanism (which can be either motorized or pneumatic), any necessary controls and a suitable enclosure. Protection nest 28 has one or more pockets 30 that may be customized based on the size and shape of the beads being processed.

Figure 3:
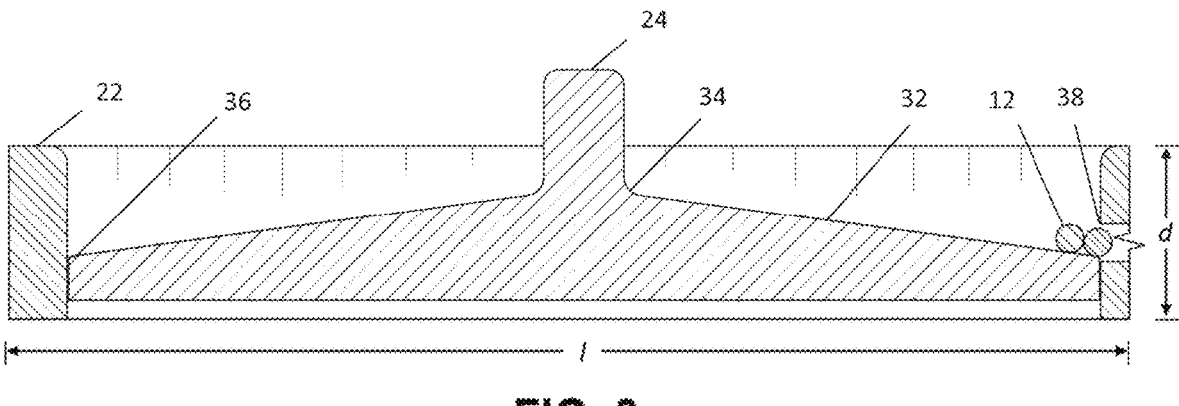
FIG. 3 is a detail view that schematically illustrates a bulk hopper according to an embodiment.

An isolated view of rotating disk 24 is shown in FIG. 3, where disk 24 is shown with taper 32 from a relatively higher elevation at the axis of rotation 34 to a relatively lower elevation at the circumference 36. As such, gravity acts to migrate beads contained within bulk hopper 22 towards the circumference. Aperture 38 communicates with the inlet of singulation tube 26 so that beads 12 may be drawn into singulation tube by the vacuum force discussed below. Similarly, rotation of disk 24 conveys beads positioned around the circumference to a position adjacent aperture 38 to be drawn into singulation tube 26. The design of bulk hopper 22 can vary in depth "d" and length "l" to accommodate required number of beads based on bead size, desired runtime, available footprint or other relevant constraints. In one exemplary embodiment, approximate internal dimensions of bulk hopper 22 may be approximately 3" length×1" depth. In some applications, bulk hopper 22 may also feature a locking cover that requires a barcode scan of the container being processed or other security mechanism to ensure beads can only be loaded into the correct hopper when multiple bead singulator and dispensers are present. Based on feedback from down stream sensors the wheel can stop, rotate or reverse direction to present beads to singulation tube 26. This technique reduces damage to beads by not stacking beads on top of each other while on the rotating feed disk or in the feed tube.

Figure 4:
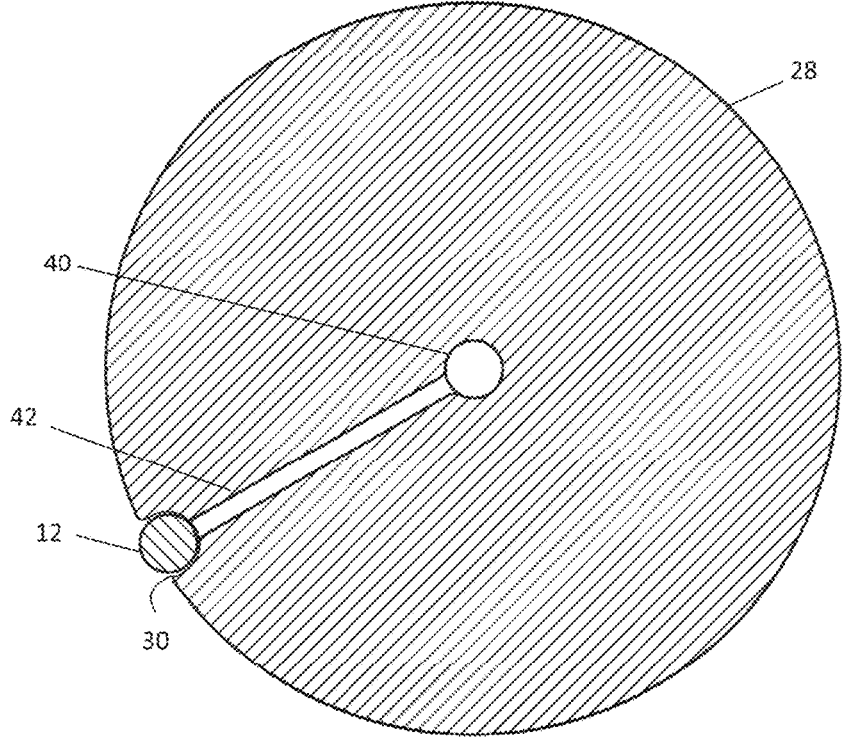
FIG. 4 is a detail view that schematically illustrates a protection nest according to an embodiment.

During operation, protection nest 28 is oriented in a pick-up position, such that pocket 30 is aligned with the outlet of singulation tube 26. A vacuum source 40 is coupled to manipulation port 42 and acts to induce negative pressure within singulation tube 26. Correspondingly, the beads 12 delivered to aperture 38 of hopper 22 via the rotation and taper of disk 24 can be drawn into singulation tube 26. As further shown in the detail view of FIG. 4, the depth of pocket 30 may be configured with a size and shape so that only one bead 12 can fit driven by the bead's size and shape. The width/diameter of pocket 30 may be slightly oversized with smooth radius entry edges to avoid damage to the bead when being pulled in by vacuum while preventing more than one bead from entering. Providing a plurality of pockets, side by side, enables placement of multiple beads at the same time for higher throughput. Typical beads can range between 1 mm to 5 mm in diameter and some beads may have unique features like a flat spot or non-spherical shape.

Figure 5:
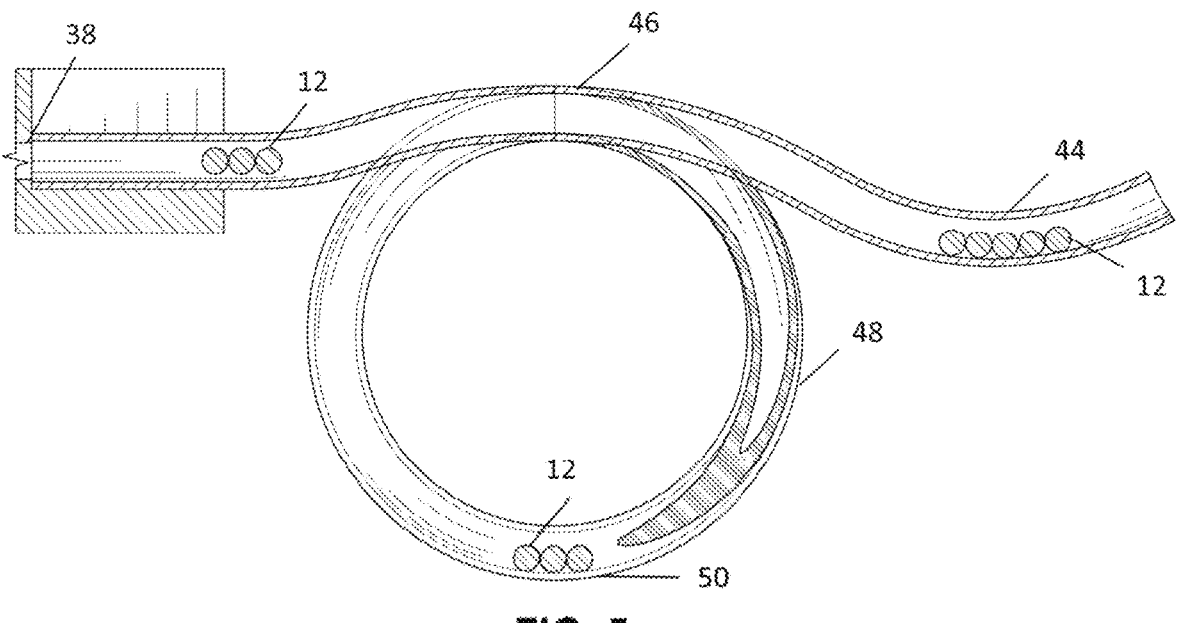
FIG. 5 is a detail view that schematically illustrates a singulation tube according to an embodiment FIG. 6 schematically illustrates delivery of a bead from a protection nest to a bead receiver via a transfer tube according to an embodiment.

Singulation tube 26 may be configured to provide defined elevation zones to help control the delivery of beads 12 from hopper 22 to protection nest 28 as further depicted in FIG. 5. Notably, a buffer zone 44 of singulation tube 26 has an elevation that is relatively lower than pocket 30 of protection nest 28 when aligned in the pick-up position shown in FIG. 2. As noted above, the vacuum force communicated by manipulation port 42 will act to draw any beads 12 located in buffer zone 44 towards pocket 30. Once one bead 12 has been singulated and seated in pocket 30, the vacuum force is at least partially blocked and is substantially reduced, allowing the remaining beads 12 to return to the relative minimum elevation of buffer zone 44. An additional buffering action is provided by configuring singulation tube 26 with a separation threshold 46 having a relative elevation greater than aperture 38 and buffer zone 44. Again, when manipulation port 42 is unobstructed by a bead 12, the force provided by vacuum source 40 draws beads 12 through aperture 38 of hopper 22 into singulation tube 26. Some beads 12 will progress beyond separation threshold 46 and come to rest in buffer zone 44 while the remaining beads 12 will return back towards hopper 22 when the vacuum force is reduced by the blockage of a bead 12 being seated in pocket 30. Additional control over delivery of beads may be obtained by using an optional loop 48 of singulation tube 26, such as may be warranted by bead type or size. As will be appreciated, loop 48 creates another elevational minimum that functions as a supplemental buffer zone 50 and can retain a portion of beads 12 prior to being delivered to buffer zone 44.

Figure 6:
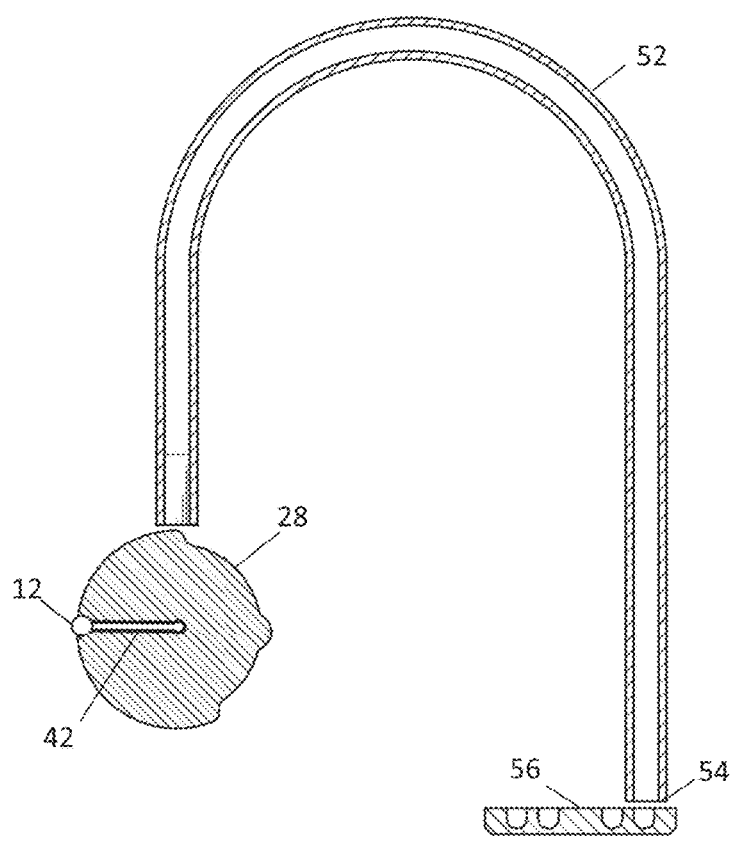

Once bead 12 has been seated in pocket 30, protection nest 28 may be rotated to deliver the singulated bead for further processing. For example, in the embodiment schematically depicted in FIG. 6, protection nest 28 presents singulated bead 12 to transfer tube 52, such that the vacuum source 40 can be switched off and pressurized air applied to manipulation port 42 to eject bead 12 into tube 52. Alternatively, an additional vacuum source coupled to transfer tube 52 may be used to draw the singulated bead 12 from pocket 30 into transfer tube 52. As shown, transfer tube 52 terminates with an outlet at delivery port 54 where the bead is ejected after singulation. It will be appreciated that transfer tube 52 may be fixed so that bead receiver 56 is moved into position or may be moveable and potentially under automation to adjust the position of delivery port 54 relative to a fixed bead receiver 56. Further details regarding the handling of singulated beads may be found in commonly-owned U.S. Patent Publication 2023/0410589, which is hereby incorporated by reference in its entirety.

As will be appreciated, the configuration of singulation tube 26, such as buffer zone 44, separation threshold 46 and optional loop 48, can be adjusted to control the amount of beads in the buffer and eliminate or reduce pressure on beads during singulation and delivery to protection nest 28. The beads are pulled into buffer zone 44 by vacuum source 40 coupled through manipulation port 42 and once a bead is pulled into pocket 30, the vacuum is disrupted and at least reduced a sufficient amount so that remaining beads fall back down towards buffer zone 44 while protection nest 28 rotates to align pocket 30 with transfer tube 52. Separation threshold 46 helps control the amount of beads in buffer zone 44 and ultimate backpressure of the buffer zone. Additional variables that may adjusted as desired include:

Vacuum rate as controlled by regulator and the gap between protection nest 28 and singulation tube 26.

Characteristics of rotating disk 24, such as angle, speed and direction, that may be controlled by motor and downstream sensors.

Elevation differential between hopper 22 and protection nest 28, either by design or configurable.

Elevation and/or size of buffer zone 44, separation threshold 46, and/or optional loop 48, either by design or configurable.

The bead singulator and dispensers of this disclosure can be implemented into process flows in any suitable manner. In one non-limiting illustration, bead singulator and dispenser 20 may be configured as a tabletop unit where an operator would manually place a bead receiver to be loaded on to a fixed tooling nest and perform the operations discussed above to dispense a single bead into the device. This unit could accommodate multiple feeders and nests to populate the device with more than one bead or chemistries without cross contamination. As another example, one or more bead singulator and dispensers of this disclosure may be incorporated into a semi-automated tool. In this scenario, an operator would place a tray, stack or other pattern of bead receivers to be populated at the input and fill bulk hopper 22 with beads to be singulated. The system based on the software program would proceed to index and populate each pocket of the bead receivers with the desired beads. Yet another example involves integrating bead singulator and dispensers into a larger, fully automated system which would dispense beads to desired locations along with other processes (sealing, assembling, sorting and inspecting).

The exemplary embodiments disclosed above are merely intended to illustrate the various utilities of this disclosure. It is understood that numerous modifications, variations and combinations of functional elements and features of the present disclosure are possible in light of the above teachings and, therefore, within the scope of the appended claims, the present disclosure may be practiced otherwise than as particularly disclosed, and the principles of this disclosure can be extended easily with appropriate modifications to other applications.

All patents and publications are herein incorporated for reference to the same extent as if each individual publication was specifically and individually indicated to be incorporated by reference. It should be understood that although the present disclosure has been specifically disclosed by preferred embodiments and optional features, modification and variation of the concepts herein disclosed may be resorted by those skilled in the art, and that such modifications and variations are considered to be within the scope of this disclosure.

What is claimed is:

1. A bead singulator and dispenser comprising:
a bulk hopper configured to hold and present a plurality of beads;
a rotating protection nest having a pocket configured to retain a single bead;
a singulation tube defining a pathway from the bulk hopper to the rotating protection nest, the singulation tube comprising a buffer zone having an elevation relatively below the pocket of the rotating protection nest when the pocket is in the pickup position; and
a vacuum source configured to draw beads from the bulk hopper into the singulation tube when the pocket of the rotating protection nest is in a pickup position and aligned with the singulation tube.

2. The bead singulator and dispenser of claim 1, wherein the singulation tube is coupled to an aperture in the bulk hopper and further comprises a separation threshold having an elevation relatively above the aperture and the buffer zone.

3. The bead singulator and dispenser of claim 1, wherein the singulation tube further comprises a loop that defines a supplemental buffer zone.

4. The bead singulator and dispenser of claim 1, wherein the vacuum source is configured to be at least partially blocked when a single bead is seated in the pocket of the rotating protection nest.

5. The bead singulator and dispenser of claim 1, wherein the rotating protection nest is configured to rotate to a position that aligns a bead seated within the pocket with a transfer tube.

6. The bead singulator and dispenser of claim 1, wherein the bulk hopper comprises a rotating disk having a circumference and an axis of rotation, wherein the bulk hopper tapers from a relatively greater elevation at the axis of rotation to a relatively lesser elevation at the circumference.

7. The bead singulator and dispenser of claim 6, wherein the rotating disk is controllable to achieve a desired rate of delivery of the plurality of beads in the bulk hopper to the singulation tube.

8. The bead singulator and dispenser of claim 7, wherein controlling the rotating disk comprises adjusting at least one of an angle of the taper of the disk, a speed of rotation of the disk and a direction of rotation of the disk.

9. A method for singulating and dispensing one bead from a plurality of beads comprising:
providing a bulk hopper configured to hold and present a plurality of beads;
coupling the bulk hopper to a singulation tube that defines a pathway from the bulk hopper to a rotating protection nest, the rotating protection nest having a pocket configured to retain a single bead and the singulation tube comprising a buffer zone that has an elevation relatively below the pocket of the rotating protection nest when the pocket is in the pickup position; and
employing a vacuum source to draw beads from the bulk hopper into the singulation tube when the pocket of the rotating protection nest is in a pickup position and aligned with the singulation tube until a single bead is seated within the pocket.

10. The method of claim 9, wherein the singulation tube is coupled to an aperture in the bulk hopper and further comprising providing a separation threshold in the singulation tube that has an elevation relatively above the aperture and the buffer zone.

11. The method of claim 9, further comprising providing a loop in the singulation tube that defines a supplemental buffer zone, such that another portion of beads remaining in the singulation tube after the single bead is seated within the pocket migrate to the supplemental buffer zone.

12. The method of claim 9, further comprising configuring the vacuum source so that the vacuum source is at least partially blocked when the single bead is seated in the pocket of the protection nest.

13. The method of claim 9, further comprising rotating the rotating protection nest to a position that aligns the single bead seated within the pocket with a transfer tube.

14. The method of claim 9, further comprising providing the bulk hopper with a rotating disk having a circumference and an axis of rotation, wherein the bulk hopper tapers from a relatively greater elevation at the axis of rotation to a relatively lesser elevation at the circumference.

15. The method of claim 14, further comprising controlling the rotating disk to achieve a desired rate of delivery of the plurality of beads in the bulk hopper to the singulation tube.

16. The method of claim 15, wherein controlling the rotating disk comprises adjusting at least one of an angle of the taper of the disk, a speed of rotation of the disk and a direction of rotation of the disk.

* * * * *